(12) United States Patent
Chang et al.

(10) Patent No.: US 12,259,239 B2
(45) Date of Patent: Mar. 25, 2025

(54) SHEET DETECTION DEVICE AND DETECTION METHOD THEREOF

(71) Applicant: KINPO ELECTRONICS, INC., New Taipei (TW)

(72) Inventors: Tzu-Cheng Chang, New Taipei (TW); Wei-Chun Jau, New Taipei (TW)

(73) Assignee: KINPO ELECTRONICS, INC., New Taipei (TW)

( * ) Notice: Subject to any disclaimer, the term of this patent is extended or adjusted under 35 U.S.C. 154(b) by 195 days.

(21) Appl. No.: 18/096,022

(22) Filed: Jan. 12, 2023

(65) Prior Publication Data
US 2024/0167801 A1 May 23, 2024

(30) Foreign Application Priority Data
Nov. 23, 2022 (CN) .......................... 202211473594.9

(51) Int. Cl.
*G01B 7/02* (2006.01)
*B65H 1/00* (2006.01)
*G01D 5/14* (2006.01)

(52) U.S. Cl.
CPC ............... *G01B 7/02* (2013.01); *B65H 1/00* (2013.01); *G01D 5/14* (2013.01); *B65H 2403/411* (2013.01); *B65H 2511/10* (2013.01); *B65H 2553/81* (2013.01)

(58) Field of Classification Search
CPC ....... G01B 7/02; G01D 5/14; B65H 2403/411
See application file for complete search history.

(56) References Cited

U.S. PATENT DOCUMENTS

| 5,493,216 A | * | 2/1996 | Asa | G01D 5/145 |
| | | | | 324/207.2 |
| 2009/0091313 A1 | * | 4/2009 | Teeters | G01B 7/003 |
| | | | | 324/207.16 |
| 2014/0001701 A1 | * | 1/2014 | Lu | B65H 1/04 |
| | | | | 271/171 |

FOREIGN PATENT DOCUMENTS

| JP | S63132747 U | 8/1988 |
| TW | 201402343 A | 1/2014 |

* cited by examiner

*Primary Examiner* — Minh Q Phan
(74) *Attorney, Agent, or Firm* — Chun-Ming Shih; HDLS IPR SERVICES

(57) ABSTRACT

A sheet detection device includes: a magnetic sensing element disposed on a sheet guide, wherein the sheet guide brings the magnetic sensing element to move to a first position or a second position; a first magnetic element disposed on a sheet tray corresponding to the first position; a second magnetic element disposed on the sheet tray corresponding to the second position and in spaced with the first magnetic element; a processing element electrically connected with the magnetic sensing element. When the magnetic sensing element outputs a first voltage signal, the processing element determines the sheet guide is located at the first position according to the first voltage signal. When the magnetic sensing element outputs a second voltage signal, the processing element determines the sheet guide is located at the second position according to the second voltage signal. The first voltage signal is different from the second voltage signal.

12 Claims, 12 Drawing Sheets

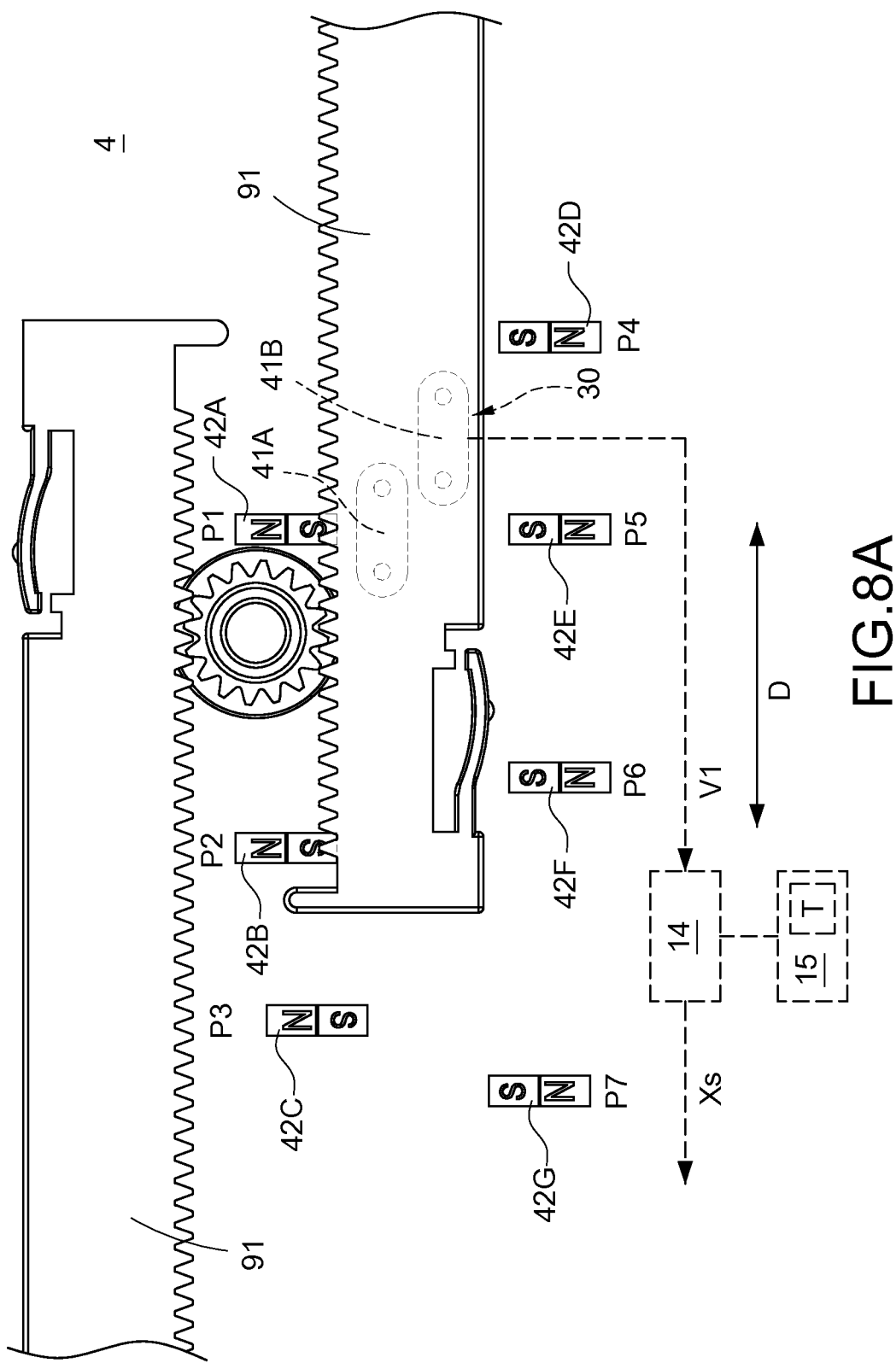

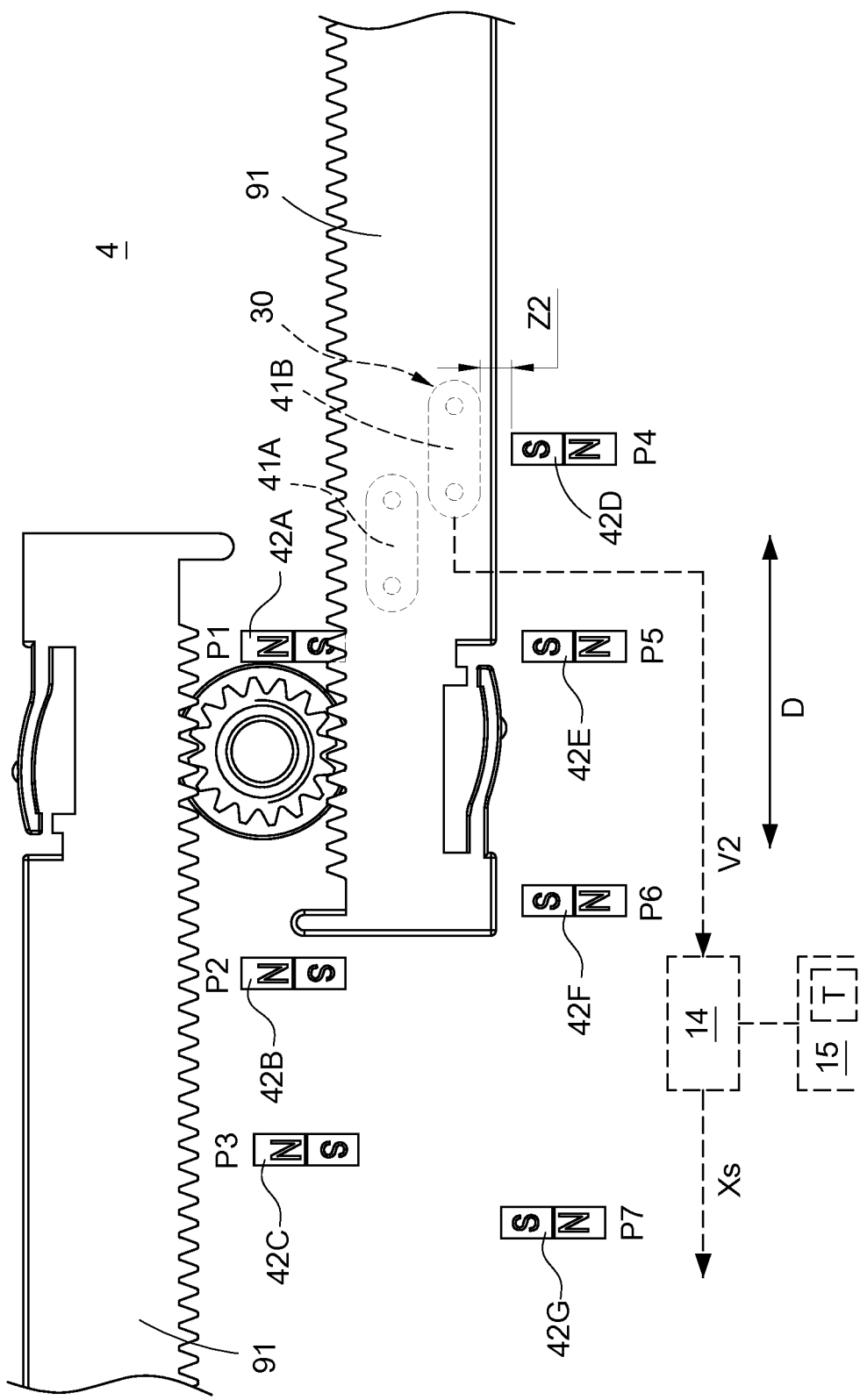

SHEET DETECTION DEVICE AND DETECTION METHOD THEREOF

BACKGROUND OF THE DISCLOSURE

Technical Field

The disclosure relates to a detection device, and particularly relates to a sheet detection device and a detection method thereof.

Description of Related Art

In the related-art sheet detection mechanism, the main structure includes an input tray and an optical scale sensing module. Further, the optical sensor may be disposed on the sheet guide, and the optical sensor is being moved to the required location by the movement of the sheet guide. Therefore, the width size of the sheet may be obtained from the position read by the optical sensor.

On the other hand, in the Taiwanese invention publication No. TW 201402343A, the sheet detection mechanism of the printer includes a sheet tray, a width regulator, a length regulator, and a logic unit. The width regulator and the length regulator are disposed on the front surface of the bottom plate in the sheet tray. A sheet-putting area is collectively formed by the width regulator, the length regulator, and the bottom plate. The sheet detection mechanism further includes a first magnetic element disposed on the width regulator, a second magnetic element disposed on the length regulator, and multiple magnetic sensing elements disposed on the back surface of the bottom plate. Each magnetic sensing element generates a position signal when sensing the first magnetic element or the second magnetic element. The logic unit determines the sheet size in the sheet-putting area according to the position signal combinations generated by the magnetic sensing elements.

However, in the design concept of the related arts, the optical sensor or the magnetic sensing element are all structured by detecting "YES" or "NO" signal. Therefore, when the sheet guide or the regulator slightly shifts from the position of predetermined sheet size, the optical sensor or the magnetic sensing element may still generate signal, but the signal strength may not be corresponding to the predetermined strength. As a result, that may cause erroneous signal determination, and further cause erroneous sheet-size determination.

In view of this, the inventors have devoted themselves to the aforementioned related arts, researched intensively try to solve the aforementioned problems.

SUMMARY OF THE DISCLOSURE

The purpose of the disclosure is to provide a sheet detection device and a detection method thereof for precisely detecting the sheet size.

The disclosure provides a sheet detection device incorporated with a sheet tray. The sheet tray includes a sheet guide. The sheet detection device includes: at least one magnetic sensing element disposed on the sheet guide, wherein when the sheet guide moves along a moving direction, the sheet guide is configured to bring the magnetic sensing element to move to a first position or a second position; a first magnetic element disposed on the sheet tray and corresponding to the first position; a second magnetic element disposed on the sheet tray and in spaced with the first magnetic element, and corresponding to the second position; and a processing element electrically connected with the magnetic sensing element. When the magnetic sensing element is configured to output a first voltage signal corresponding to the first magnetic element, the processing element is configured to determine that the sheet guide is located at the first position according to the first voltage signal. When the magnetic sensing element is configured to output a second voltage signal corresponding to the second magnetic element, the processing element is configured to determine that the sheet guide is located at the second position according to the second voltage signal. The first voltage signal is different from the second voltage signal.

In some embodiments, when the sheet guide is located at the first position, the magnetic sensing element is adjacent to the first magnetic element, the magnetic sensing element and the first magnetic element are distanced in a first distance, and the magnetic sensing element is configured to output the first voltage signal corresponding to the first distance and a magnetic intensity of the first magnetic element.

In some embodiments, when the sheet guide is located at the second position, the magnetic sensing element is adjacent to the second magnetic element, the magnetic sensing element and the second magnetic element are distanced in a second distance, and the magnetic sensing element is configured to output the second voltage signal corresponding to the second distance and a magnetic intensity of the second magnetic element.

In some embodiments, the magnetic intensity of the first magnetic element is different from the magnetic intensity of the second magnetic element, and the first distance is different from or same with the second distance.

In some embodiments, the magnetic intensity of the first magnetic element is same with the magnetic intensity of the second magnetic element, and the first distance is different from the second distance.

In some embodiments, the processing element is configured to output a first sheet size signal corresponding to the first position according to the first voltage signal, and output a second sheet size signal corresponding to the second position according to the second voltage signal.

In some embodiments, a magnetic moment direction of the first magnetic element and a magnetic moment direction of the second magnetic element are parallel to each other, and the magnetic moment direction of the first magnetic element and the magnetic moment direction of the second magnetic element are perpendicular to the moving direction.

In some embodiments, the sheet detection device includes two magnetic sensing elements disposed staggeredly to each other on the sheet guide along the moving direction.

In some embodiments, the first magnetic element and the second magnetic element are located at two sides of the magnetic sensing elements opposite to each other.

In some embodiments, when the sheet guide is located at the first position, one magnetic sensing element is adjacent to the first magnetic element, the one magnetic sensing element and the first magnetic element are distanced in a first distance, and the one magnetic sensing element is configured to output the first voltage signal corresponding to the first distance and a magnetic intensity of the first magnetic element.

In some embodiments, when the sheet guide is located at the second position, another magnetic sensing element is adjacent to the second magnetic element, the another magnetic sensing element and the second magnetic element are distanced in a second distance, and the another magnetic sensing element is configured to output the second voltage signal corresponding to the second distance and a magnetic intensity of the second magnetic element.

In some embodiments, the sheet detection device further includes a storage element electrically connected with the processing element, and configured to store a magnetic force-voltage lookup table.

In some embodiments, the magnetic force-voltage lookup table includes a first voltage data and a first sheet size data corresponding to the first voltage data.

In some embodiments, the first voltage data includes a voltage value and a permissible range corresponding to the voltage value.

In some embodiments, when the processing element determines that the first voltage signal is corresponding to the first voltage data, the processing element is configured to output a first sheet size signal corresponding to the first position according to the first sheet size data.

The disclosure provides a detection method of a sheet detection device. The detection method includes movably disposing a sheet guide on a sheet tray along a moving direction, and incorporating with a processing element and a storage element. The detection method includes: disposing a magnetic sensing element on the sheet guide, disposing a first magnetic element on the sheet tray, and storing a magnetic force-voltage lookup table in the storage element; when the sheet guide moves along the moving direction, generating a first voltage signal, by the magnetic sensing element disposed on the sheet guide, corresponding to the first magnetic element disposed on the sheet tray; receiving the first voltage signal by the processing element; and determining, by the processing element, that the sheet guide is located at a first position according to the first voltage signal and the magnetic force-voltage lookup table.

In some embodiments, the determining, by the processing element, of the sheet guide being located at the first position further includes: outputting a first sheet size signal, by the processing element, corresponding to the first position according to the first voltage signal.

In some embodiments, the detection method further includes: disposing a second magnetic element on the sheet tray; generating a second voltage signal, by the magnetic sensing element, corresponding to the second magnetic element disposed on the sheet tray; receiving the second voltage signal by the processing element; and determining, by the processing element, that the sheet guide is located at a second position according to the second voltage signal and the magnetic force-voltage lookup table. The first voltage signal is different from the second voltage signal.

In some embodiments, the determining, by the processing element, of the sheet guide being located at the second position further includes: outputting a second sheet size signal, by the processing element, corresponding to the second position according to the second voltage signal.

In some embodiments, the magnetic force-voltage lookup table includes a first voltage data and a first sheet size data corresponding to the first voltage data, the determining, by the processing element, of the sheet guide being located at the first position further includes: when the processing element determines that the first voltage signal is corresponding to the first voltage data, the processing element is configured to output a first sheet size signal corresponding to the first position according to the first sheet size data.

In summary, the sheet detection device of the disclosure has the first magnetic element and the second magnetic element be disposed on a first position and a second position, and has the magnetic sensing element generate a first voltage signal and a second voltage signal different with each other corresponding to the first magnetic element and the second magnetic element. As a result, when the sheet guide brings the magnetic sensing element to move to different positions, the magnetic sensing element is configured to generate different voltage signals corresponding to different magnetic elements, and the processing element is configured to precisely determine the position of the magnetic sensing element. Comparing to the related art, which is solely structured by detecting "YES" or "NO" signal, the magnetic sensing element of the sheet detection device of the disclosure may still generate the corresponding voltage signal when the position of the magnetic sensing element is slightly deviated. Therefore, the erroneous signal determination may be avoided, and the size of the sheet abutted by the sheet guide may be precisely determined.

Further, the detection method of the sheet detection device of the disclosure may be used to precisely configure the positions of multiple magnetic elements by the processing element according to the magnetic force-voltage lookup table stored in the storage element, and to concretely obtain the structure and functions of the aforementioned sheet detection device.

BRIEF DESCRIPTION OF THE DRAWINGS

FIG. 8A and FIG. 8B are the schematic diagrams of usage statuses of the sheet detection device in the fourth embodiment of the disclosure.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
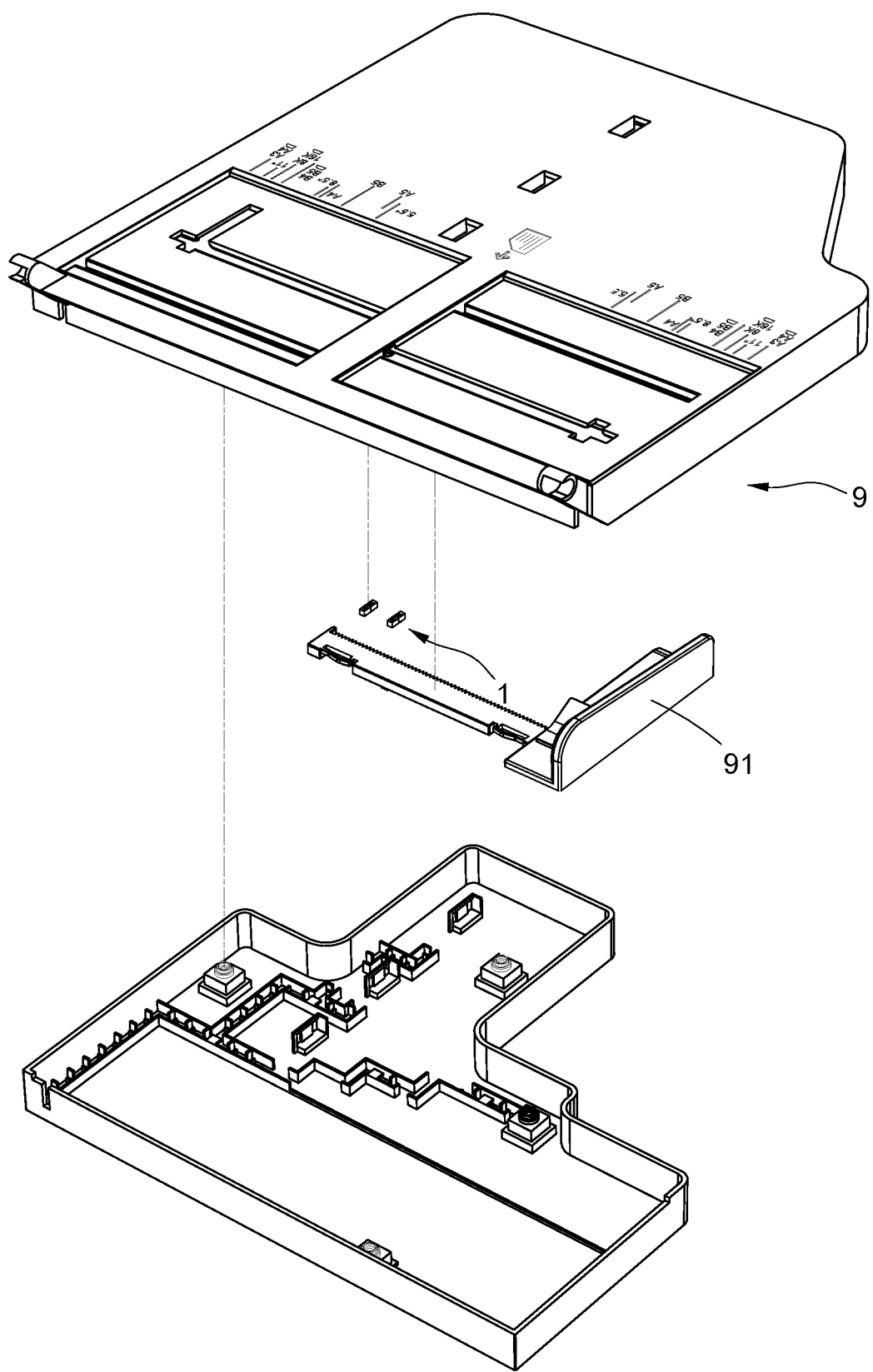
FIG. 1 is a schematic diagram of a sheet detection device incorporated with a sheet tray in the first embodiment of the disclosure.
Figure 2:
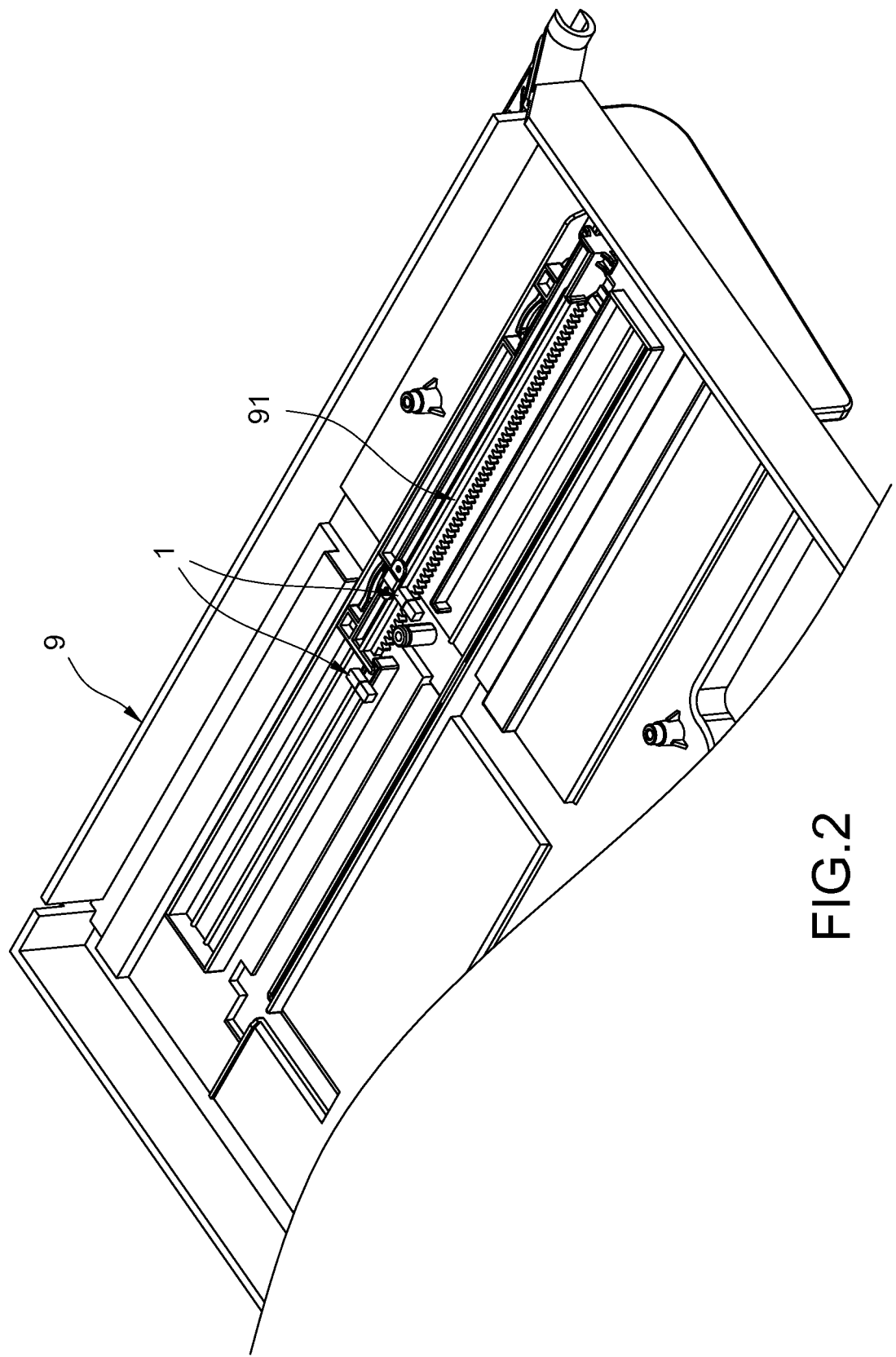
FIG. 2 is a schematic diagram of the sheet detection device in the first embodiment of the disclosure.
Figure 3A:
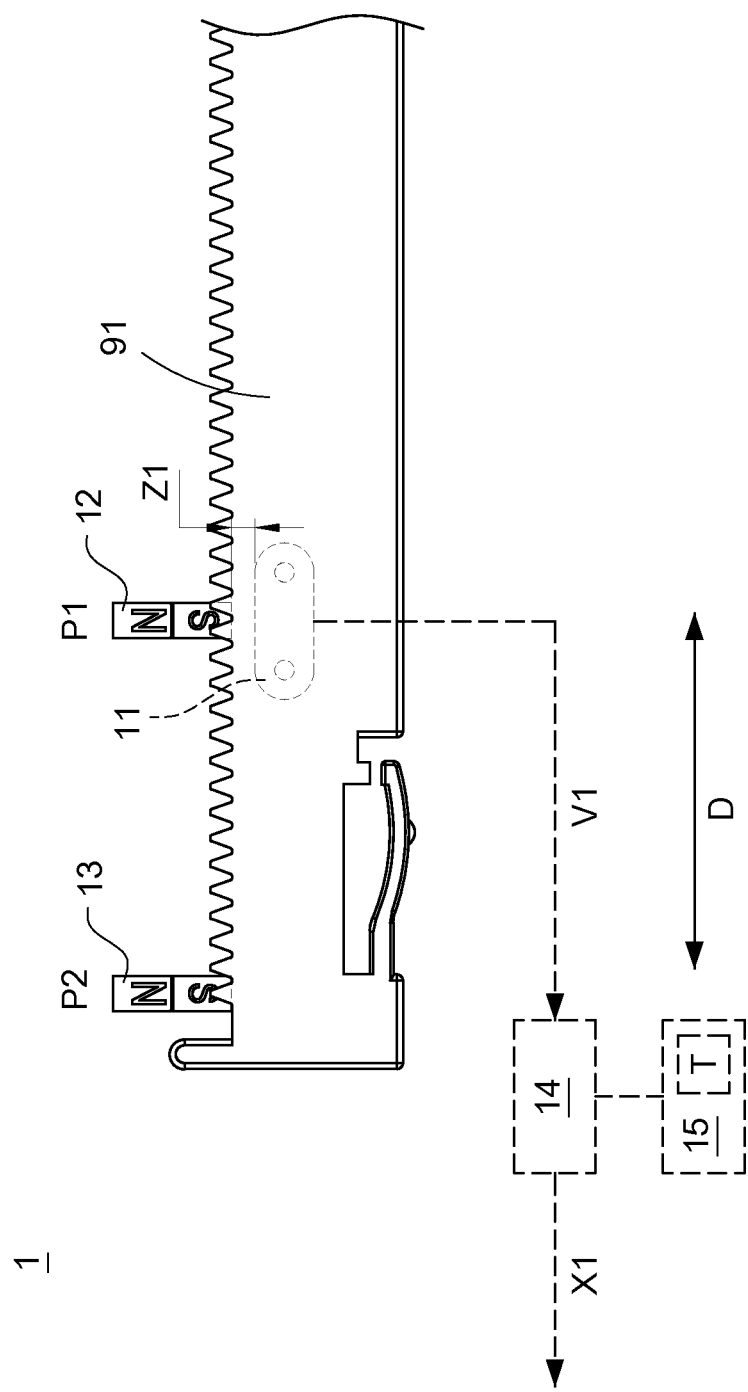
FIG. 3A and FIG. 3B are the schematic diagrams of usage statuses of the sheet detection device in the first embodiment of the disclosure.
Figure 3B:
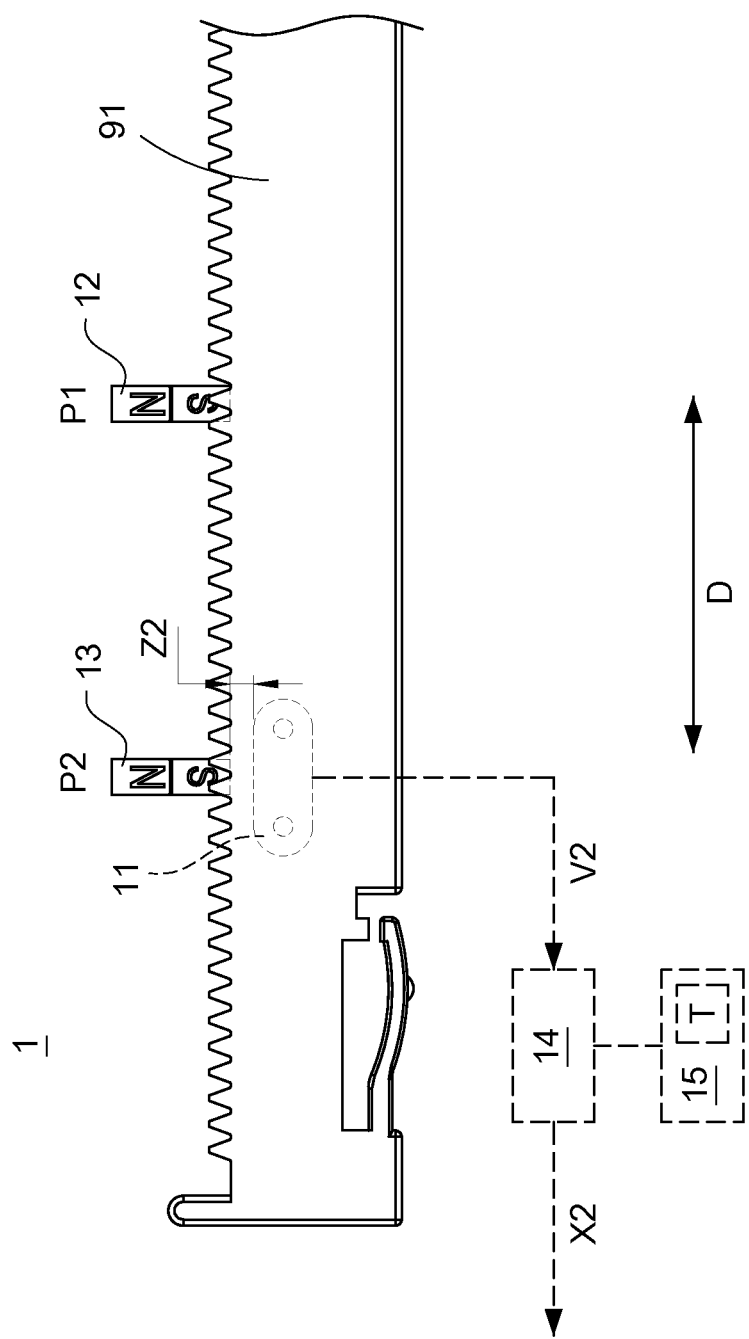

FIG. 1 is a schematic diagram of a sheet detection device 1 incorporated with a sheet tray 9 in the first embodiment of the disclosure. FIG. 2 is a schematic diagram of the sheet detection device 1 in the first embodiment of the disclosure. FIG. 3A and FIG. 3B are the schematic diagrams of usage statuses of the sheet detection device 1 in the first embodiment of the disclosure.

Figure 4:
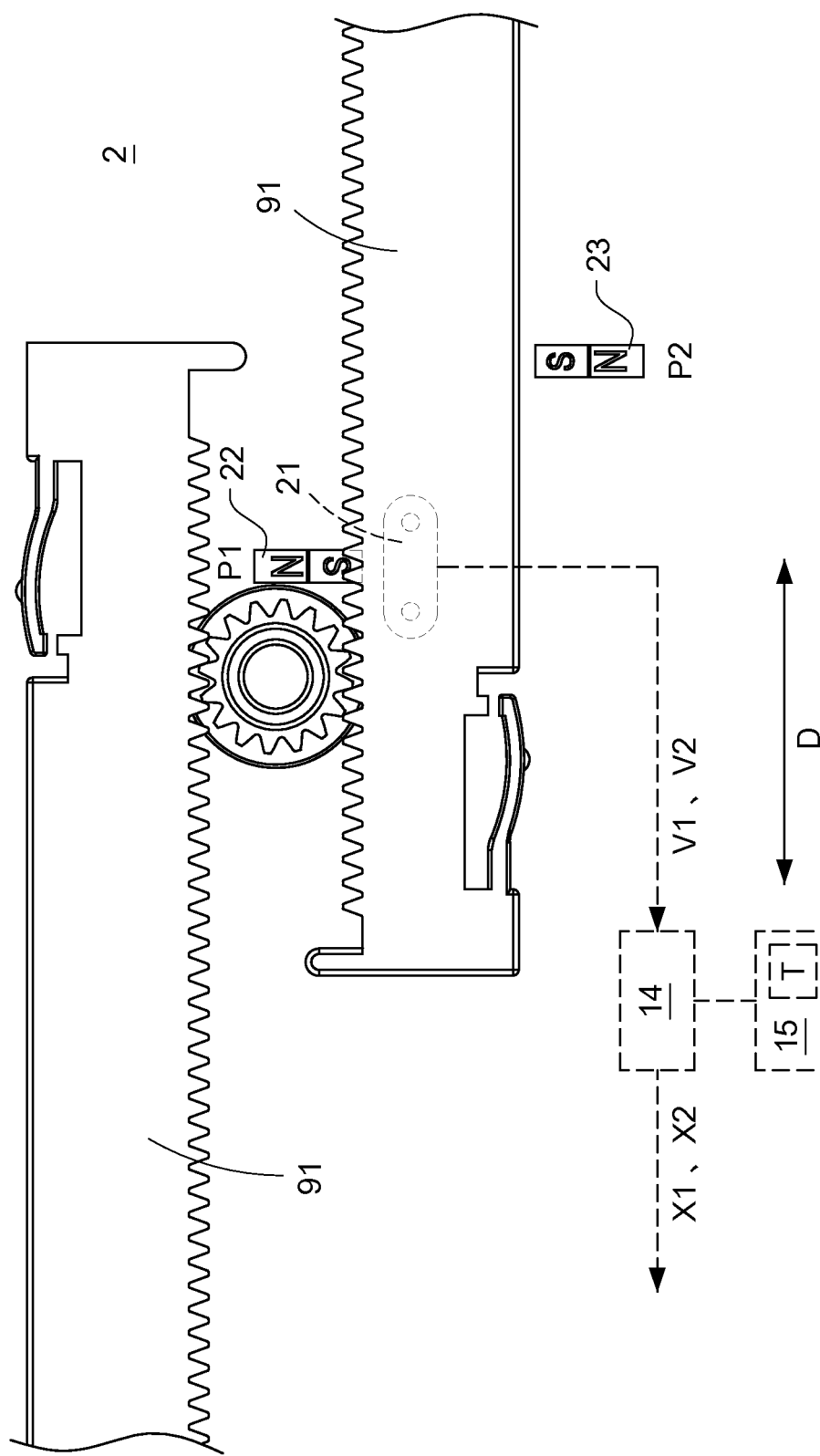
FIG. 4 is a schematic diagram of the sheet detection device in the second embodiment of the disclosure.

Referring to FIG. 1, FIG. 2, and FIG. 3A, the sheet detection device 1 of the embodiment may be, for example, disposed to be incorporated with the sheet tray 9 of a printer (not shown in figures). The sheet tray 9 may include a sheet guide 91. The sheet guide 91 is disposed in the sheet tray 9 and capable of moving along a moving direction D. It should be noted that the sheet guide 91 may be a single side (such as left side, right side or bottom side) sheet guide (as shown in FIG. 1), left side and right side linked sheet guide (as shown in FIG. 4 below), or left side (or right side) and bottom side linked sheet guide (not shown in figures), or the other sheet guides of linked or non-linked in different manners, here is not intended to be limiting. The aforementioned left side, right side or bottom side are described with respect to the side of the sheet tray 9 connected to the sheet inlet of the printer as the upper side.

The sheet detection device 1 of the embodiment includes a magnetic sensing element 11, a first magnetic element 12, a second magnetic element 13, and a processing element 14.

The magnetic sensing element 11 is disposed on the sheet guide 91. The magnetic sensing element 11 may be, for example, a Hall sensor, here is not intended to be limiting. When the sheet guide 91 moves along the moving direction D, the sheet guide is configured to bring the magnetic sensing element 11 to move to a first position P1 or a second position P2. The first position P1 and the second position P2 are set with respect to the sheet size to be detected. That is, when the magnetic sensing element 11 is adjacent to the first position P1 and the second position P2, the sheet guide 91 abuts against the sheets with different sizes, respectively.

The first magnetic element 12 is disposed on the sheet tray 9 and corresponding to the first position P1. The first magnetic element 12 may be, for example, a magnet, and the magnetic intensity (or magnetic force) of the first magnetic element 12 is not limiting. For example, the magnetic intensity may be 3200 G, 2560 G, 1300 G, or other suitable magnetic intensity. Moreover, the arrangement of the direction of the magnetic moment (the direction from south pole S to north pole N of the magnet) of the first magnetic element 12 is not limiting. Here uses south pole S being disposed on the side adjacent to the magnetic sensing element 11 as an example.

The second magnetic element 13 is disposed on the sheet tray 9 and in spaced with the first magnetic element 12, and is corresponding to the second position P2. The second magnetic element 13 may be, for example, a magnet, and the magnetic intensity (or magnetic force) of the second magnetic element 13 is not limiting. For example, the magnetic intensity may be 3200 G, 2560 G, 1300 G, or other suitable magnetic intensity. Similarly, the arrangement of the direction of the magnetic moment of the second magnetic element 13 is not limiting. Here uses south pole S being disposed on the side adjacent to the magnetic sensing element 11 as an example. It should be noted that the arrangement of the direction of the magnetic moment of the first magnetic element 12 and the second magnetic element 13 may be the same or different, here is not intended to be limiting. In some embodiments, the direction of the magnetic moment of the first magnetic element 12 and the direction of the magnetic moment of the second magnetic element 13 are parallel to each other, the magnetic moment direction of the first magnetic element 12 and the magnetic moment direction of the second magnetic element 13 are perpendicular to the moving direction D.

It is worth mentioning that the first magnetic element 12 and the second magnetic element 13 may the magnets of the same or different magnetic intensities.

In some embodiments, the first magnetic element 12 and the second magnetic element 13 may be located at the same side of the magnetic sensing element 11 (as shown in FIG. 3A), located at two sides of the magnetic sensing element opposite to each other (as shown in FIG. 4 below), or located at the bottom side of the magnetic sensing element (not shown in figures, that is, the magnetic element is overlapped with the sheet guide 91 from top view), here is not intended to be limiting. The requirement is that the magnetic sensing element 11 is capable of generating the voltage signal correspondingly.

The processing element 14 is electrically connected with the magnetic sensing element 11. The processing element 14 may include, for example, a sensor integrated circuit, a microcontroller unit (MCU), a microprocessor unit (MPU), a central processing unit (CPU), an application-specific integrated circuit (ASIC), a digital signal processor (DSP), a graphics processing unit (GPU), a field-programmable gate array (FPGA), or a system-on-chip (SoC), etc.

In some embodiments, the sheet detection device 1 may further include a storage element 15. The storage element 15 is electrically connected with the processing element 14, and configured to store a magnetic force-voltage lookup table T. The storage element 15 may be, for example, a nonvolatile storage medium, such as a read-only memory (ROM), an electrically-erasable programmable read-only memory (EEPROM), a flash memory (such as NAND flash or SSD with control chip, etc.), etc., here is not intended to be limiting.

Therefore, when the user moves the sheet guide 91 in the sheet tray 9 along the moving direction D to abut against the sheet, the magnetic sensing element 11 moves with the sheet guide 91. When the magnetic sensing element 11 outputs the first voltage signal V1 corresponding to the first magnetic element 12, the processing element 14 is configured to determine that the sheet guide 91 is located at the first position P1 according to the first voltage signal V1 and the magnetic force-voltage lookup table T. Specifically, the formula of the magnetic sensing element 11 generating the first voltage signal V1 (that is, $V_{out}$ in the formula (1) below) corresponding to the first magnetic element 12 is as below.

$$V_{out} = V_Q + B \times \left(\frac{A1}{Z1}\right) \quad (1)$$

$$B = \frac{B_r}{2}\left(\frac{D+Z}{\sqrt{R^2+(D+Z)^2}} - \frac{Z}{\sqrt{R^2+Z^2}}\right) \quad (2)$$

$V_Q$ is the lowest output voltage of the magnetic sensing element 11.

$$\frac{A1}{Z1}$$

is the magnetic sensitivity option of the magnetic sensing element 11, for example, 200 mV/mT, here is not intended to be limiting. $B_r$ is remanence (referring to the data of physical magnet), which is irrelevant to the geometry of the first magnetic element 12 (for example, magnet). Z is the distance between pole faces on the symmetric axis. D is the thickness of the first magnetic element 12. R is the radius of the first magnetic element 12 (for example, a round magnet). It is worth mentioning that the aforementioned calculation is, for example, being calculated and evaluated under the room temperature of 23° C., here is not intended to be limiting.

Moreover, when the sheet guide 91 is located at the first position P1, the magnetic sensing element 11 is adjacent to the first magnetic element 12, the magnetic sensing element 11 and the first magnetic element 12 are distanced in a first distance Z1 (that is, the parameter Z in the formula (2) above), and the magnetic sensing element 11 is configured to output the first voltage signal V1 corresponding to the first distance Z1 and the magnetic intensity of the first magnetic element 12. It should be noted that the magnetic sensing element 11 being adjacent to the first magnetic element 12 indicates, for example, the center axis of the magnetic sensing element 11 and the center axis of the first magnetic element 12 being aligned with each other, or the center point of the magnetic sensing element 11 and the center point of the first magnetic element 12 being distanced in the shortest distance, or the other condition which the magnetic sensing element 11 is adjacent to the first magnetic element 12 and generates the first voltage signal V1, here is not intended to be limiting. Further, the first distance Z1 is not limited to the condition which the magnetic sensing element 11 and the first magnetic element 12 are distanced in the shortest distance. The first distance Z1 is the distance which the magnetic sensing element 11 is capable of generating the first voltage signal V1 corresponding to the first magnetic element 12.

Therefore, when the processing element 14 determines that the sheet guide 91 is located at the first position P1 according to the first voltage signal V1 and the magnetic force-voltage lookup table T, the processing element 14 is configured to output a first sheet size signal X1 corresponding to the first position P1 according to the first voltage signal V1.

Further, referring to FIG. 3B, when the user moves the sheet guide 91 in the sheet tray 9 along the moving direction D to abut against the sheet, the magnetic sensing element 11 outputs the second voltage signal V2 (that is, $V_{out}$ in the formula (1) above) corresponding to the second magnetic element 13, the processing element 14 is configured to determine that the sheet guide 91 is located at the second position P2 according to the second voltage signal V2 and the magnetic force-voltage lookup table T. It should be noted that the first voltage signal V1 (as shown in FIG. 3A) is different from the second voltage signal V2.

Specifically, when the sheet guide 91 is located at the second position P2, the magnetic sensing element 11 is adjacent to the second magnetic element 13, the magnetic sensing element 11 and the second magnetic element 13 are distanced in a second distance Z2 (that is, the parameter Z in the formula (2) above), and the magnetic sensing element 11 is configured to output the second voltage signal V2 corresponding to the second distance Z2 and the magnetic intensity of the second magnetic element 13. It should be noted that the magnetic sensing element 11 being adjacent to the second magnetic element 13 indicates, for example, the center axis of the magnetic sensing element 11 and the center axis of the second magnetic element 13 being aligned with each other, or the center point of the magnetic sensing element 11 and the center point of the second magnetic element 13 being distanced in the shortest distance, or the other condition which the magnetic sensing element 11 is adjacent to the second magnetic element 13 and generates the second voltage signal V2, here is not intended to be limiting. Further, the second distance Z2 is not limited to the condition which the magnetic sensing element 11 and the second magnetic element 13 are distanced in the shortest distance. The second distance Z2 is the distance which the magnetic sensing element 11 is capable of generating the second voltage signal V2 corresponding to the second magnetic element 13.

Therefore, when the processing element 14 determines that the sheet guide 91 is located at the second position P2 according to the second voltage signal V2, the processing element 14 is configured to output a second sheet size signal X2 corresponding to the second position P2 according to the second voltage signal V2.

It is worth mentioning that if the magnetic intensity of the first magnetic element 12 is different from the magnetic intensity of the second magnetic element 13, the first distance Z1 may be different from or the same with the second distance Z2. On the other hand, if the magnetic intensity of the first magnetic element 12 is the same with the magnetic intensity of the second magnetic element 13, the first distance Z1 is different from the second distance Z2.

Therefore, the sheet detection device 1 of the embodiment has the first magnetic element 12 and the second magnetic element 13 be disposed on the first position P1 and the second position P2, and has the magnetic sensing element 11 generate the first voltage signal V1 and the second voltage signal V2 different with each other corresponding to the first magnetic element 12 and the second magnetic element 13. As a result, when the sheet guide 91 brings the magnetic sensing element 11 to move to different positions, the magnetic sensing element 11 is configured to generate different voltage signals V1, V2 corresponding to different magnetic elements 12, 13, and the processing element 14 is configured to precisely determine the position of the magnetic sensing element 11. Comparing to the related art, which is solely structured by detecting "YES" or "NO" signal, the magnetic sensing element 11 of the sheet detection device 1 of the embodiment may still generate the corresponding voltage signals V1, V2 when the position of the magnetic sensing element 11 is slightly deviated. Therefore, the erroneous signal determination may be avoided, and the size of the sheet abutted by the sheet guide 91 may be precisely determined.

FIG. 4 is a schematic diagram of the sheet detection device 2 in the second embodiment of the disclosure. The differences between the sheet detection device 2 of the embodiment and the sheet detection device 1 are that the sheet guide 91 is a left side and right side linked sheet guide, and the first magnetic element 22 and the second magnetic element 23 are located at two sides of the magnetic sensing element 21 opposite to each other.

It is worth mentioning that the arrangement of the direction of the magnetic moment of the first magnetic element 22 and the second magnetic element 23 is not limiting. Here uses south pole S being disposed on the side adjacent to the magnetic sensing element 21 as an example.

Similarly, when the sheet guide 91 is located at the first position P1, the magnetic sensing element 21 is adjacent to the first magnetic element 22, and the magnetic sensing element 21 is configured to output the first voltage signal V1 correspondingly. When the sheet guide 91 is located at the second position P2, the magnetic sensing element 21 is adjacent to the second magnetic element 23, and the magnetic sensing element 21 is configured to output the second voltage signal V2 correspondingly. Thus, the processing element 14 is configured to output the first sheet size signal X1 or the second sheet size signal X2 according to the first voltage signal V1 or the second voltage signal V2, and the magnetic force-voltage lookup table T.

Therefore, comparing to the first magnetic element 22 and the second magnetic element 23 being disposed on the same side, the first magnetic element 22 and the second magnetic element 23 may be kept in a desirable distance in a manner of being disposed on two sides of the magnetic sensing element 21 opposite to each other. As a result, the condition of the magnetic sensing element 21 being simultaneously influenced by the first magnetic element 22 and the second magnetic element 23, when the first magnetic element 22 and the second magnetic element 23 are not desirably distanced, may be avoided, and the sheet size being abutted by the sheet guide 91 may be determined more precisely.

Figure 5:
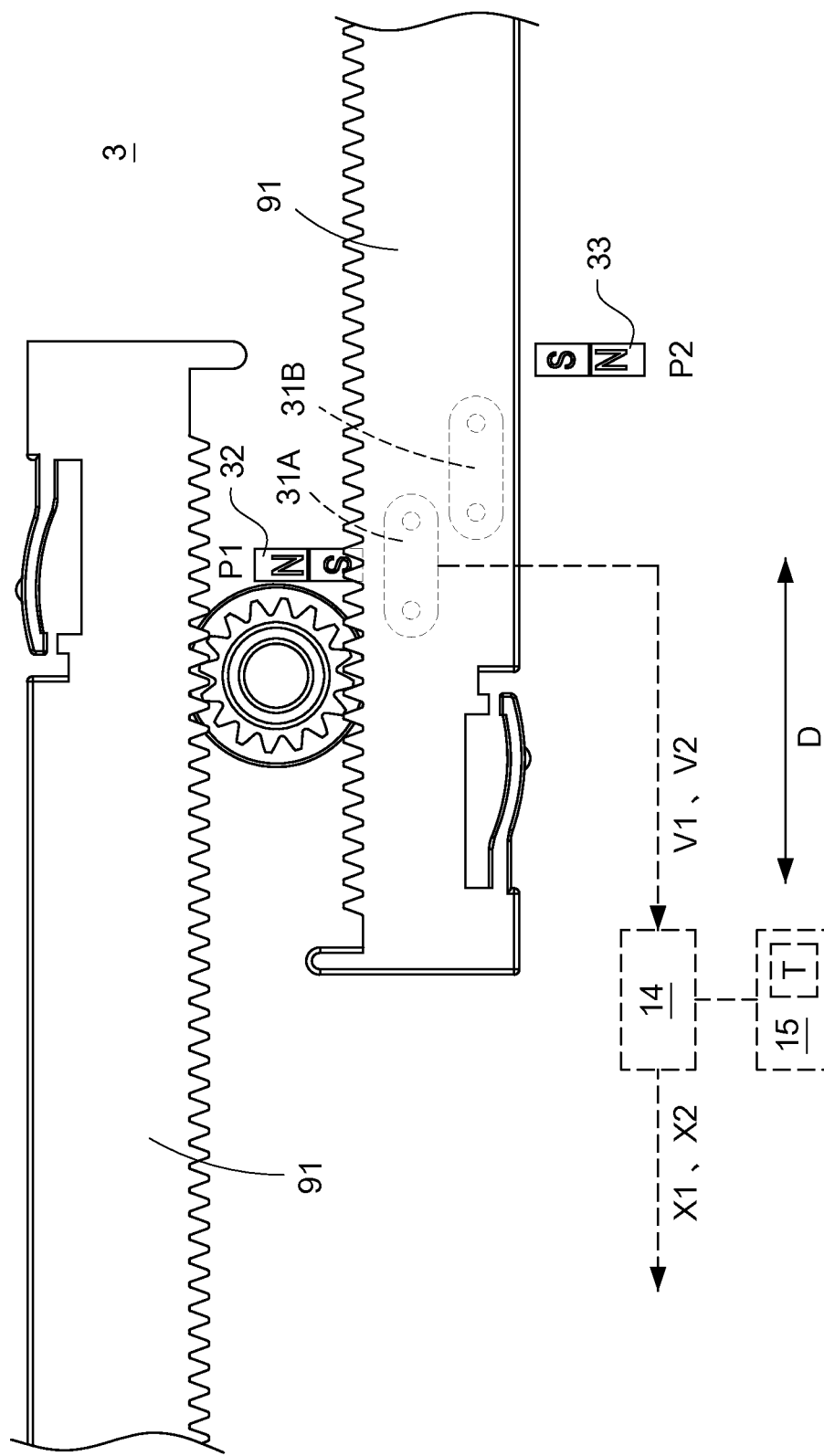
FIG. 5 is a schematic diagram of the sheet detection device in the third embodiment of the disclosure.

FIG. 5 is a schematic diagram of the sheet detection device 3 in the third embodiment of the disclosure. The differences between the sheet detection device 3 of the embodiment and the aforementioned sheet detection device 2 are that the sheet detection device 3 has two magnetic sensing elements 31A, 31B, and the magnetic sensing elements 31A, 31B are disposed staggeredly on one component of the sheet guide 91 along the moving direction D. Further, the processing element 14 is electrically connected with the magnetic sensing elements 31A, 31B.

It is worth mentioning that "disposed staggeredly" indicates the central axes of the magnetic sensing elements 31A, 31B being staggered with a distance (for example, 10 mm). The magnetic sensing elements 31A, 31B may be non-coincided (or non-overlapped), or partly coincided (or overlapped). The distance of the magnetic sensing elements 31A, 31B being staggered is not limiting, the design may be different depending on different requirement. It should be noted that in the left side and right side linked sheet guide 91, the magnetic sensing elements 31A, 31B may be disposed on different components of the sheet guide 91.

Similarly, when the sheet guide 91 is located at the first position P1, the magnetic sensing element 31A is adjacent to the first magnetic element 32, and the magnetic sensing element 31A is configured to output the first voltage signal V1 correspondingly. When the sheet guide 91 is located at the second position P2, the magnetic sensing element 31B is adjacent to the second magnetic element 33, and the magnetic sensing element 31B is configured to output the second voltage signal V2 correspondingly. Thus, the processing element 14 is configured to output the first sheet size signal X1 or the second sheet size signal X2 according to the first voltage signal V1 or the second voltage signal V2, and the magnetic force-voltage lookup table T.

Therefore, comparing to one magnetic sensing element, the distance between the first magnetic element 32 and the second magnetic element 33 on the moving direction D may be decreased by two magnetic sensing elements 31A, 31B being disposed staggeredly, and the whole structure of the sheet detection device 3 may be further compacted.

Figure 6:
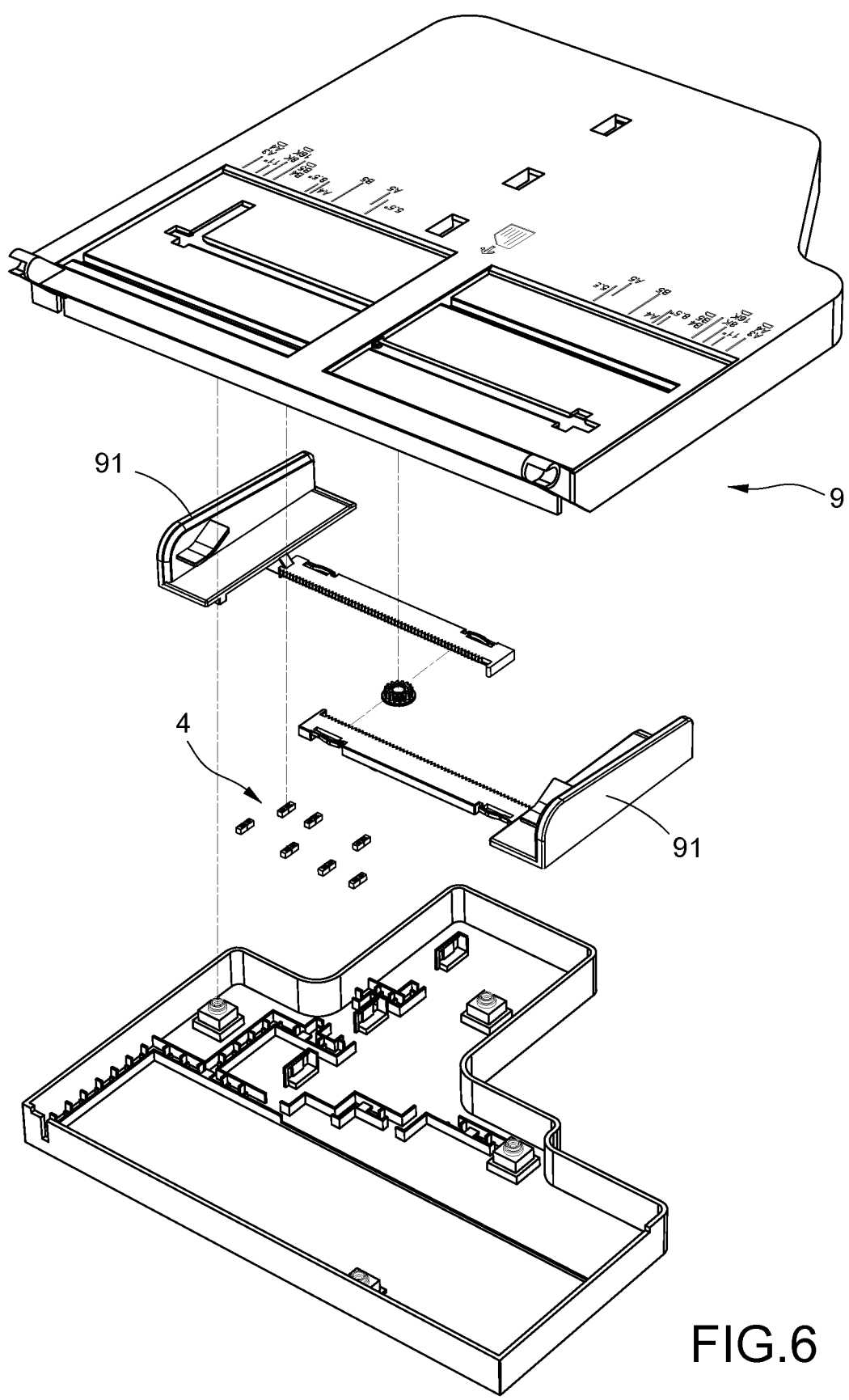
FIG. 6 is a schematic diagram of a sheet detection device incorporated with a sheet tray in the fourth embodiment of the disclosure.
Figure 7:
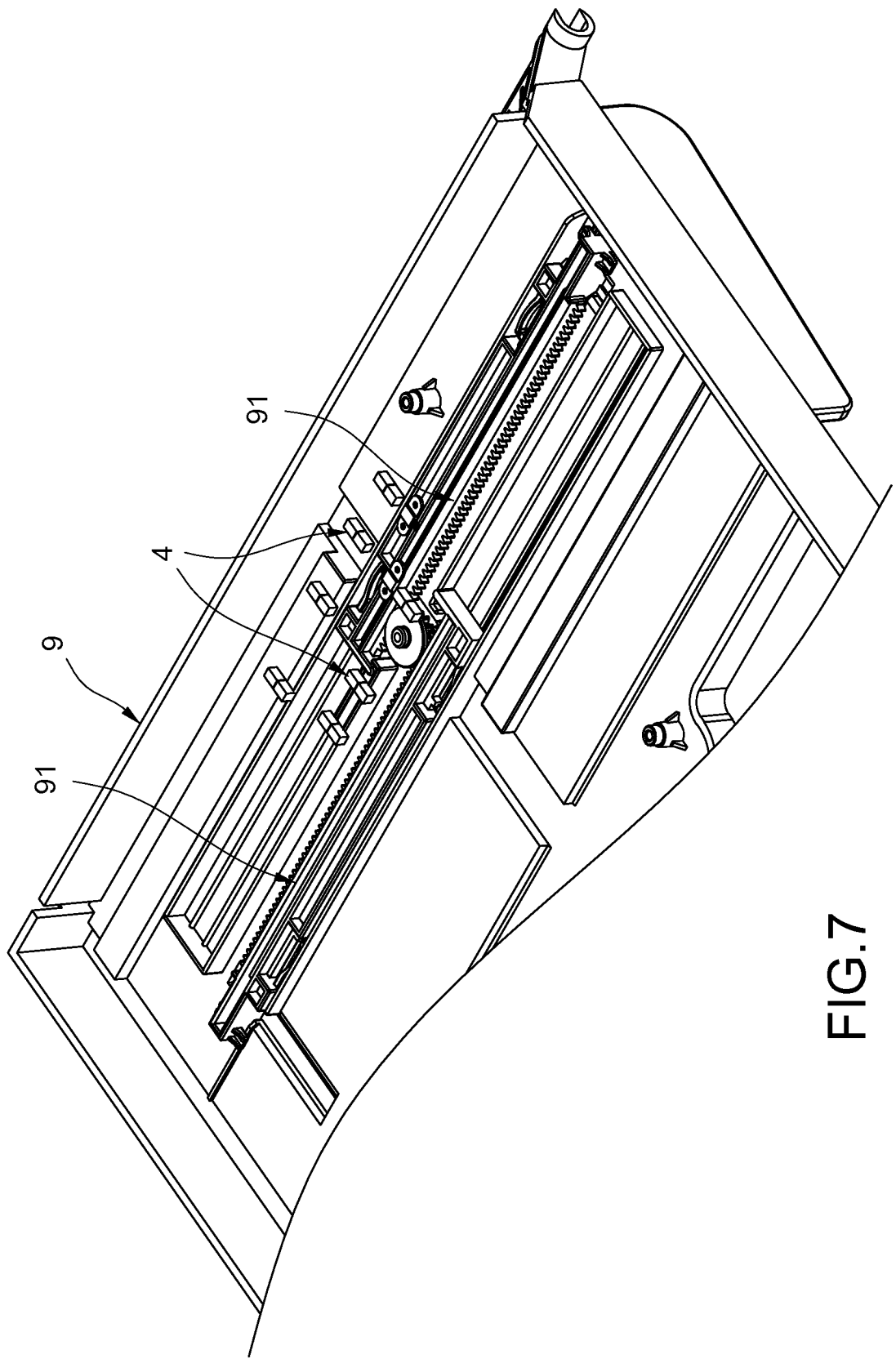
FIG. 7 is a schematic diagram of the sheet detection device in the fourth embodiment of the disclosure.

FIG. 6 is a schematic diagram of a sheet detection device 4 incorporated with a sheet tray 9 in the fourth embodiment of the disclosure. FIG. 7 is a schematic diagram of the sheet detection device 4 in the fourth embodiment of the disclosure. FIG. 8A and FIG. 8B are the schematic diagrams of usage statuses of the sheet detection device 4 in the fourth embodiment of the disclosure.

Referring to FIG. 6, FIG. 7 and FIG. 8A, the difference between the sheet detection device 4 of the embodiment and the aforementioned sheet detection device 3 is that the sheet detection device 4 has the number of the magnetic elements 42A, 42B, 42C, 42D, 42E, 42F, 42G corresponding to the number of the sheet size types to be detected. In the embodiment, the sheet detection device 4 is configured to have seven magnetic elements 42A, 42B, 42C, 42D, 42E, 42F, 42G respectively corresponding to the sheet sizes of LT LEF (letter, long edge feed), LT SEF (letter, short edge feed), B5 SEF (B5, short edge feed), A3 SEF (A3, short edge feed), B4 SEF (B4, short edge feed), A4 SEF (A4, short edge feed), and A5 SEF (A5, short edge feed) as an example, here is not intended to be limiting. Further, here uses two magnetic sensing elements 41A, 41B as an example, here is not intended to be limiting, and more than two magnetic sensing elements may be disposed depending on different designs.

The magnetic element 42A is disposed on the sheet tray 9 and corresponding to the position P1, and the position P1 is corresponding to the sheet size LT LEF. The magnetic element 42B is disposed on the sheet tray 9 and corresponding to the position P2, and the position P2 is corresponding to the sheet size LT SEF. The magnetic element 42C is disposed on the sheet tray 9 and corresponding to the position P3, and the position P3 is corresponding to the sheet size B5 SEF. The magnetic element 42D is disposed on the sheet tray 9 and corresponding to the position P4, and the position P4 is corresponding to the sheet size A3 SEF. The magnetic element 42E is disposed on the sheet tray 9 and corresponding to the position P5, and the position P5 is corresponding to the sheet size B4 SEF. The magnetic element 42F is disposed on the sheet tray 9 and corresponding to the position P6, and the position P6 is corresponding to the sheet size A4 SEF. The magnetic element 42G is disposed on the sheet tray 9 and corresponding to the position P7, and the position P7 is corresponding to the sheet size A5 SEF. The magnetic elements 42A, 42B, 42C, 42D, 42E, 42F, 42G may be, for example, a magnet.

The table 1 below, for example, is one embodiment of the magnetic force-voltage lookup table T. The magnetic force-voltage lookup table T includes the magnetic intensity (or magnetic force) of the magnetic elements 42A, 42B, 42C, 42D, 42E, 42F, 42G, the distance Z (the distance that the magnetic sensing element is adjacent to the magnetic element, for example, the first distance Z1 in FIG. 8A and the second distance Z2 in FIG. 8B) between the magnetic elements 42A, 42B, 42C, 42D, 42E, 42F, 42G and the magnetic sensing elements 41A, 41B, the voltage data (including the voltage value $V_{out}$ and the permissible range) generated by the magnetic sensing elements 41A, 41B correspondingly, and the sheet size data corresponding to the voltage data, here is not intended to be limiting.

TABLE 1

| | Magnetic intensity (G) | Distance Z (mm) | +10% | $V_{out}$ | −10% | Sheet size |
|---|---|---|---|---|---|---|
| 42A(P1) | 3200 | 2 | 3.62 | 3.34 | 3.07 | LT LEF/279 mm |
| 42B(P2) | 2560 | 2 | 2.73 | 2.54 | 2.34 | LT SEF/216 mm |
| 42C(P3) | 1300 | 1 | 2.06 | 1.93 | 1.79 | B5 SEF/182 mm |
| 42D(P4) | 2560 | 3 | 1.50 | 1.42 | 1.33 | A3 SEF/297 mm |
| 42E(P5) | 3200 | 4 | 1.36 | 1.29 | 1.22 | B4 SEF/257 mm |
| 42F(P6) | 2560 | 4 | 1.06 | 1.02 | 0.98 | A4 SFF/210 mm |
| 42G(P7) | 1300 | 2 | 0.99 | 0.96 | 0.92 | A5 SEF/148 mm |

It is worth mentioning that the magnet may have ±10% of magnetic force variation during manufacturing. Thus, the voltage values $V_{out}$ generated by the magnetic sensing elements 41A, 41B may have ±10% of permissible range.

Therefore, referring to FIG. 8A, when the user moves the sheet guide 91 in the sheet tray 9 along the moving direction D to abut against the sheet, the magnetic sensing element 41A moves with the sheet guide 91. When the magnetic sensing element 41A outputs the voltage signal V1 corresponding to the magnetic element 42A, the processing element 14 is configured to determine that the sheet guide 91 is located at the first position P1 according to the table 1 (for example, the magnetic force-voltage lookup table T, which is stored in the storage element 15 electrically connected with the processing element 14) and the voltage signal V1 (for example, the range of 3.07 V-3.62 V corresponding to the voltage data of 42A(P1) in the table 1). It should be noted that the magnetic sensing element 41B may generate the voltage signal corresponding to another magnetic element at the same time, but the processing element 14 is configured to determine that the magnetic sensing element 41B is not corresponding to any predetermined position according to the table 1.

Further, when the sheet guide 91 is located at the first position P1, the magnetic sensing element 41A is adjacent to the magnetic element 42A, the magnetic sensing element 41A and the magnetic element 42A are distanced in a distance Z1 (that is, the parameter Z in the formula (2) above, for example, 2 mm in the table 1), and the magnetic sensing element 41A is configured to output the voltage signal V1 corresponding to the distance Z1 and the magnetic intensity (for example, 3200 G in the table 1) of the magnetic element 42A. It should be noted that the magnetic sensing element 41A being adjacent to the magnetic element 42A indicates, for example, the center axis of the magnetic sensing element 41A and the center axis of the magnetic element 42A being aligned with each other, or the center point of the magnetic sensing element 41A and the center point of the magnetic element 42A being distanced in the shortest distance, or the other condition which the magnetic sensing element 41A is adjacent to the magnetic element 42A and generates the voltage signal V1, here is not intended to be limiting. Further, the distance Z1 is not limited to the condition which the magnetic sensing element 41A and the magnetic element 42A are distanced in the shortest distance. The distance Z1 is the distance which the magnetic sensing element 41A is capable of generating the voltage signal V1 corresponding to the magnetic element 42A.

Therefore, when the processing element 14 determines that the sheet guide 91 is located at the position P1 according to the voltage signal V1, the processing element 14 is configured to determine the sheet size data (for example, indicating the sheet size LT LEF) corresponding to the voltage signal V1 according to the table 1 to output the sheet size signal Xs corresponding to the position P1.

Moreover, referring to FIG. 8B, when the user moves the sheet guide 91 in the sheet tray 9 along the moving direction D to abut against the sheet and the magnetic sensing element 41B outputs the voltage signal V2 corresponding to the magnetic element 42D, the processing element 14 is configured to determine that the sheet guide 91 is located at the first position P4 according to the table 1 and the voltage signal V2 (for example, the range of 1.33 V-1.50 V corresponding to the voltage data of 42D(P4) in the table 1). It should be noted that the magnetic sensing element 41A may generate the voltage signal corresponding to another magnetic element at the same time, but the processing element 14 is configured to determine that the magnetic sensing element 41A is not corresponding to any predetermined position according to the table 1.

Further, when the sheet guide 91 is located at the first position P4, the magnetic sensing element 41B is adjacent to the magnetic element 42D, the magnetic sensing element 41B and the magnetic element 42D are distanced in a distance Z2 (that is, the parameter Z in the formula (2) above, for example, 3 mm in the table 1), and the magnetic sensing element 41B is configured to output the voltage signal V2 corresponding to the distance Z2 and the magnetic intensity (for example, 2560 G in the table 1) of the magnetic element 42D. It should be noted that the magnetic sensing element 41B being adjacent to the magnetic element 42D indicates, for example, the center axis of the magnetic sensing element 41B and the center axis of the magnetic element 42D being aligned with each other, or the center point of the magnetic sensing element 41B and the center point of the magnetic element 42D being distanced in the shortest distance, or the other condition which the magnetic sensing element 41B is adjacent to the magnetic element 42D and generates the voltage signal V2, here is not intended to be limiting. Further, the distance Z2 is not limited to the condition which the magnetic sensing element 41B and the magnetic element 42D are distanced in the shortest distance. The distance Z2 is the distance which the magnetic sensing element 41B is capable of generating the voltage signal V2 corresponding to the magnetic element 42D.

Therefore, when the processing element 14 determines that the sheet guide 91 is located at the position P4 according to the voltage signal V2, the processing element 14 is configured to determine the sheet size data (for example, indicating the sheet size A3 SEF) corresponding to the voltage signal V2 according to the table 1 to output the sheet size signal Xs corresponding to the position P4.

It is worth mentioning that if the magnetic intensities of the magnetic elements 42A, 42B, 42C, 42D, 42E, 42F, 42G are different from one another, the distances Z may be the same with or different from one another (for example, the magnetic elements 42A, 42B or the magnetic elements 42A, 42C in the table 1). On the other hand, if the magnetic intensity of the magnetic intensities of the magnetic elements 42A, 42B, 42C, 42D, 42E, 42F, 42G are all the same, the distances Z are different from one another (for example, the magnetic elements 42A, 42E or the magnetic elements 42B, 42F in the table 1).

In summary, the sheet detection device 4 of the embodiment has the magnetic elements 42A-42G be disposed on different position P1-P1, and has the magnetic sensing element 41A, 41B generate different voltage signals (such as the voltage signals V1, V2) corresponding to the magnetic elements 42A-42G. As a result, when the sheet guide 91 brings the magnetic sensing elements 41A, 41B to move to different positions P1-P7, the magnetic sensing elements 41A, 41B are configured to generate different voltage signals corresponding to different magnetic elements 42A-42G, and the processing element 14 is configured to precisely determine the position of the magnetic sensing elements 41A, 41B. Comparing to the related art, which is solely structured by detecting "YES" or "NO" signal, the magnetic sensing elements 41A, 41B of the sheet detection device 4 of the embodiment may still generate the corresponding voltage signals when the position of the magnetic sensing elements 41A, 41B are slightly deviated. Therefore, the erroneous signal determination may be avoided, and the size of the sheet abutted by the sheet guide 91 may be precisely determined.

Moreover, the magnetic elements 42A-42G may be kept in a desirable distance in a manner of being disposed on two sides of the magnetic sensing elements 41A, 41B opposite to each other. As a result, the condition of the magnetic sensing elements 41A, 41B being simultaneously influenced by the magnetic elements 42A-42G, when the magnetic elements 42A-42G are not desirably distanced, may be avoided, and the sheet size being abutted by the sheet guide 91 may be determined more precisely.

Further, the distance between the magnetic elements 42A-42G on the moving direction D may be decreased by two magnetic sensing elements 41A, 41B being disposed staggeredly, and the whole structure of the sheet detection device 4 may be further compacted.

The selecting manner of the magnetic force-voltage lookup table T in the aforementioned fourth embodiment is described as below, here is not intended to be limiting. In some embodiments, the magnetic force-voltage lookup table $T_{total}$ with the magnetic elements of magnetic intensities in 3200 G, 2560 G, and 1300 G are shown as below, here is not intended to be limiting. The magnetic force-voltage lookup table $T_{total}$ may include different parameters corresponding to different magnetic elements being selected.

| Magnetic force-voltage lookup table $T_{total}$ | | | | | |
| --- | --- | --- | --- | --- | --- |
| Distance (mm) | Magnetic intensity (3200 G) | | | Voltage signal | | |
| Z | +10% | B | −10% | +10% | Vout | −10% |
| 1 | 452.82 | 411.65 | 370.49 | 9.66 | 8.83 | 8.01 |
| 2 | 150.93 | 137.21 | 123.49 | 3.62 | 3.34 | 3.07 |
| 3 | 68.91 | 62.65 | 56.38 | 1.98 | 1.85 | 1.73 |
| 4 | 37.77 | 34.34 | 30.90 | 1.36 | 1.29 | 1.22 |
| 5 | 23.18 | 21.07 | 18.96 | 1.06 | 1.02 | 0.98 |
| 6 | 15.34 | 13.95 | 12.55 | 0.91 | 0.88 | 0.85 |
| 7 | 10.73 | 9.75 | 8.78 | 0.81 | 0.80 | 0.78 |
| 8 | 7.82 | 7.11 | 6.40 | 0.76 | 0.74 | 0.73 |
| 9 | 5.89 | 5.35 | 4.82 | 0.72 | 0.71 | 0.70 |
| 10 | 4.55 | 4.13 | 3.72 | 0.69 | 0.68 | 0.67 |
| 1 | 340.14 | 309.22 | 278.30 | 7.40 | 6.78 | 6.17 |
| 2 | 106.61 | 96.92 | 87.22 | 2.73 | 2.54 | 2.34 |
| 3 | 44.91 | 40.83 | 36.75 | 1.50 | 1.42 | 1.33 |
| 4 | 22.88 | 20.80 | 18.72 | 1.06 | 1.02 | 0.97 |
| 5 | 13.19 | 11.99 | 10.79 | 0.86 | 0.84 | 0.82 |
| 6 | 8.28 | 7.53 | 6.78 | 0.77 | 0.75 | 0.74 |
| 7 | 5.54 | 5.04 | 4.53 | 0.71 | 0.70 | 0.69 |
| 8 | 3.89 | 3.53 | 3.18 | 0.68 | 0.67 | 0.66 |
| 9 | 2.83 | 2.57 | 2.31 | 0.66 | 0.65 | 0.65 |
| 10 | 2.12 | 1.93 | 1.74 | 0.64 | 0.64 | 0.63 |
| 1 | 73.01 | 66.38 | 59.74 | 2.06 | 1.93 | 1.79 |
| 2 | 19.53 | 17.76 | 15.98 | 0.99 | 0.96 | 0.92 |
| 3 | 8.34 | 7.58 | 6.82 | 0.77 | 0.75 | 0.74 |
| 4 | 4.42 | 4.02 | 3.62 | 0.69 | 0.68 | 0.67 |
| 5 | 2.66 | 2.41 | 2.17 | 0.65 | 0.65 | 0.64 |
| 6 | 1.73 | 1.57 | 1.42 | 0.63 | 0.63 | 0.63 |
| 7 | 1.20 | 1.09 | 0.98 | 0.62 | 0.62 | 0.62 |
| 8 | 0.86 | 0.79 | 0.71 | 0.62 | 0.62 | 0.61 |
| 9 | 0.65 | 0.59 | 0.53 | 0.61 | 0.61 | 0.61 |
| 10 | 0.50 | 0.45 | 0.41 | 0.61 | 0.61 | 0.61 |

Specifically, the unusable voltage signals are excluded based on the conditions of repeatedly output voltage signal, the magnet types under short distance, the corresponding sheet size, etc., and the suitable magnetic elements and the arranged positions are selected. Taking the fourth embodiment in FIG. 8A as an example, under the condition of the magnet element with magnetic force of 3200 G being distanced with the magnetic sensing element in a distance Z of 2 mm, the voltage value $V_{out}$ generated by the magnetic sensing element is 3.34 V. The value is unique in the magnetic force-voltage lookup table $T_{total}$, and the same voltage signal is not generated in the other conditions. Therefore, the first magnetic element (for example, the magnetic element with magnetic force of 3200 G) may be disposed on the first position (for example, the position P1 corresponding to LT LEF). Similarly, the second magnetic element (for example, the magnetic element with magnetic force of 2560 G) may be disposed on the second position (for example, the position P2 corresponding to LT SEF).

It is worth mentioning that when the magnetic intensity of the first magnetic element and the magnetic intensity of the second magnetic element are the same, the second distance may be set to be different from the first distance according to the magnetic force-voltage lookup table $T_{total}$. Taking the fourth embodiment in FIG. 8A as an example, different magnetic elements 42A, 42E may be selected and different distances Z are set corresponding to different voltage signals.

Therefore, after the voltage signals from the magnetic sensing elements at different positions are tested to be consistent with the requirement of the magnetic force-voltage lookup table T, the arrangement of the sheet detection device of the disclosure is completed.

Figure 9:
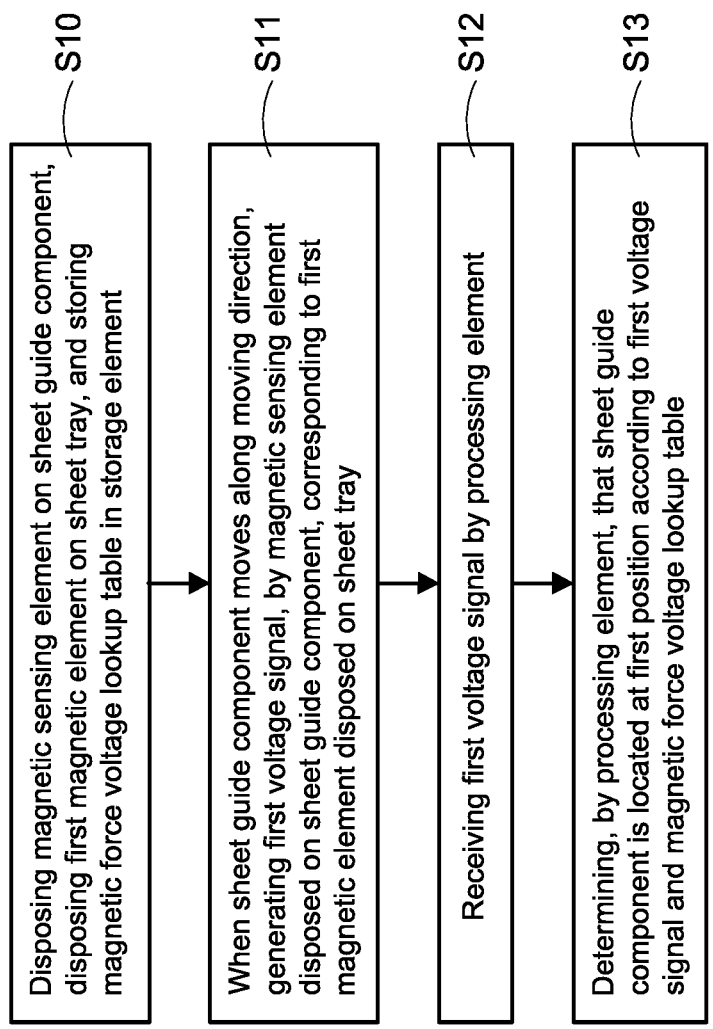
FIG. 9 is a flowchart of a detection method of the sheet detection device of the disclosure.

FIG. 9 is a flowchart of a detection method of the sheet detection device of the disclosure. As shown in FIG. 9, the detection method of the sheet detection device of the disclosure includes the step S10 to the step S13. The step S10 is disposing a magnetic sensing element on the sheet guide, disposing a first magnetic element on the sheet tray, and storing a magnetic force-voltage lookup table in the storage element. The step S11 is when the sheet guide moves along the moving direction, generating a first voltage signal, by the magnetic sensing element disposed on the sheet guide, corresponding to the first magnetic element disposed on the sheet tray. The step S12 is receiving the first voltage signal by the processing element. The step S13 is determining, by the processing element, that the sheet guide is located at a first position according to the first voltage signal and the magnetic force-voltage lookup table.

In some embodiments, the magnetic force-voltage lookup table includes a first voltage data and a first sheet size data corresponding to the first voltage data. In the step S13, the determining, by the processing element, of the sheet guide being located at the first position further includes: when the processing element determines that the first voltage signal is corresponding to the first voltage data, the processing element is configured to output a first sheet size signal corresponding to the first position according to the first sheet size data.

It worth mentioning that the detection method of the embodiment may be applied to different sheet detection device. For example, the detection method of the embodiment may be applied to the sheet detection devices 1-4 in the first embodiment to the fourth embodiment, and here is omitted for brevity.

Figure 10:
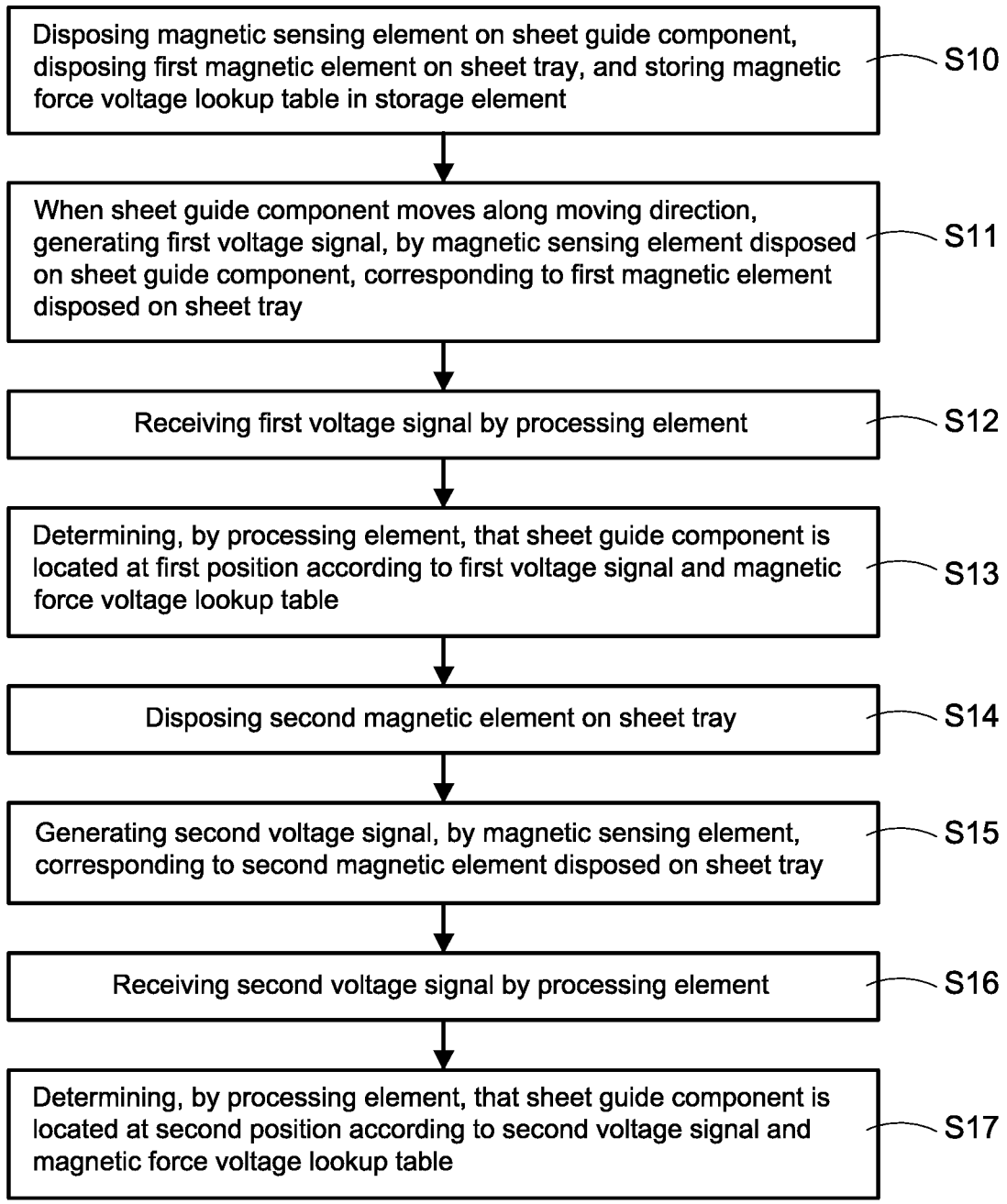
FIG. 10 is another flowchart of a detection method of the sheet detection device of the disclosure.

FIG. 10 is another flowchart of a detection method of the sheet detection device of the disclosure. The detection method of the sheet detection device of the disclosure further includes the step S14 to the step S17. The step S14 is disposing a second magnetic element on the sheet tray. The step S15 is generating a second voltage signal, by the magnetic sensing element, corresponding to the second magnetic element disposed on the sheet tray. The step S16 is receiving the second voltage signal by the processing element. The step S17 is determining, by the processing element, that the sheet guide is located at a second position according to the second voltage signal and the magnetic force-voltage lookup table.

In some embodiments, in the step S17, the determining, by the processing element, of the sheet guide being located at the second position further includes: outputting a second sheet size signal, by the processing element, corresponding to the second position according to the second voltage signal.

It worth mentioning that the detection method of the embodiment may be applied to different sheet detection device. For example, the detection method of the embodiment may be applied to the sheet detection devices 1-4 in the first embodiment to the fourth embodiment, and here is omitted for brevity.

In summary, the sheet detection device and the detection method thereof the disclosure has the magnetic elements be disposed on different positions, and has the magnetic sensing elements generate different voltage signals corresponding to the magnetic elements. As a result, when the sheet guide brings the magnetic sensing element to move to different positions, the magnetic sensing element is configured to generate different voltage signals corresponding to different magnetic elements, and the processing element is configured to precisely determine the position of the magnetic sensing element. Comparing to the related art, which is solely structured by detecting "YES" or "NO" signal, the magnetic sensing element of the sheet detection device of the disclosure may still generate the corresponding voltage signal when the position of the magnetic sensing element is slightly deviated. Therefore, the erroneous signal determination may be avoided, and the size of the sheet abutted by the sheet guide may be precisely determined.

Further, the magnetic elements may be kept in a desirable distance in a manner of being disposed on two sides of the magnetic sensing elements opposite to each other. As a result, the condition of the magnetic sensing elements being simultaneously influenced by the magnetic elements, when the magnetic elements are not desirably distanced, may be avoided, and the sheet size being abutted by the sheet guide may be determined more precisely.

Moreover, the distance between the magnetic elements on the moving direction may be decreased by the magnetic sensing elements being disposed staggeredly, and the whole structure of the sheet detection device may be further compacted.

While this disclosure has been described by means of specific embodiments, numerous modifications and variations may be made thereto by those skilled in the art without departing from the scope and spirit of this disclosure set forth in the claims.

What is claimed is:

1. A sheet detection device, incorporated with a sheet tray, the sheet tray comprising a sheet guide, the sheet detection device comprising:
   two magnetic sensing elements, disposed staggeredly to each other on the sheet guide along a moving direction, wherein when the sheet guide moves along the moving direction, the sheet guide is configured to bring the magnetic sensing elements to move to a first position or a second position;
   a first magnetic element, disposed on the sheet tray and corresponding to the first position;
   a second magnetic element, disposed on the sheet tray and in spaced with the first magnetic element, and corresponding to the second position; and
   a processing element, electrically connected with the magnetic sensing elements,
   wherein when one of the magnetic sensing elements is configured to output a first voltage signal corresponding to the first magnetic element, the processing element is configured to determine that the sheet guide is located at the first position according to the first voltage signal,
   when another one of the magnetic sensing elements is configured to output a second voltage signal corresponding to the second magnetic element, the processing element is configured to determine that the sheet guide is located at the second position according to the second voltage signal, and the first voltage signal is different from the second voltage signal.

2. The sheet detection device according to claim 1, wherein when the sheet guide is located at the first position, the one of the magnetic sensing elements is adjacent to the first magnetic element, the one of the magnetic sensing elements and the first magnetic element are distanced in a first distance, and the one of the magnetic sensing elements is configured to output the first voltage signal corresponding to the first distance and a magnetic intensity of the first magnetic element.

3. The sheet detection device according to claim 2, wherein when the sheet guide is located at the second position, the another one of the magnetic sensing elements is adjacent to the second magnetic element, the another one of the magnetic sensing elements and the second magnetic element are distanced in a second distance, and the another one of the magnetic sensing elements is configured to output the second voltage signal corresponding to the second distance and a magnetic intensity of the second magnetic element.

4. The sheet detection device according to claim 3, wherein the magnetic intensity of the first magnetic element is different from the magnetic intensity of the second magnetic element, and the first distance is different from or same with the second distance.

5. The sheet detection device according to claim 3, wherein the magnetic intensity of the first magnetic element is same with the magnetic intensity of the second magnetic element, and the first distance is different from the second distance.

6. The sheet detection device according to claim 1, wherein the processing element is configured to output a first sheet size signal corresponding to the first position according to the first voltage signal, and output a second sheet size signal corresponding to the second position according to the second voltage signal.

7. The sheet detection device according to claim 1, wherein a magnetic moment direction of the first magnetic element and a magnetic moment direction of the second magnetic element are parallel to each other, and the magnetic moment direction of the first magnetic element and the magnetic moment direction of the second magnetic element are perpendicular to the moving direction.

8. The sheet detection device according to claim 1, wherein the first magnetic element and the second magnetic element are located at two sides of the magnetic sensing elements opposite to each other.

9. The sheet detection device according to claim 1, further comprising:
   a storage element, electrically connected with the processing element, and configured to store a magnetic force-voltage lookup table.

10. The sheet detection device according to claim 9, wherein the magnetic force-voltage lookup table comprises a first voltage data and a first sheet size data corresponding to the first voltage data.

11. The sheet detection device according to claim 10, wherein the first voltage data comprises a voltage value and a permissible range corresponding to the voltage value.

12. The sheet detection device according to claim 10, wherein when the processing element determines that the first voltage signal is corresponding to the first voltage data, the processing element is configured to output a first sheet size signal corresponding to the first position according to the first sheet size data.

* * * * *